United States Patent [19]

Plehn

[11] Patent Number: 5,839,074
[45] Date of Patent: Nov. 17, 1998

[54] PROCESS OF ALLOCATING FREQUENCIES TO BASE STATIONS OF A MOBILE RADIOTELEPHONE NETWORK

[75] Inventor: Juergen Plehn, Bonn, Germany

[73] Assignee: Detemobil Deutsche Telekom Mobilnet GmbH, Bonn, Germany

[21] Appl. No.: 495,467

[22] PCT Filed: Oct. 15, 1993

[86] PCT No.: PCT/EP93/02846

§ 371 Date: Sep. 29, 1995

§ 102(e) Date: Sep. 29, 1995

[87] PCT Pub. No.: WO94/17640

PCT Pub. Date: Aug. 4, 1994

[30] Foreign Application Priority Data

Jan. 27, 1993 [DE] Germany .......................... 43 02 228.6

[51] Int. Cl.$^6$ .................................................. H04Q 7/00
[52] U.S. Cl. .............................. 455/450; 455/62; 455/63; 455/452
[58] Field of Search .................................. 455/34.1, 33.1, 455/54.1, 56.1, 62, 63, 450, 452, 524, 525; 370/329

[56] References Cited

U.S. PATENT DOCUMENTS

| | | | |
|---|---|---|---|
| 4,965,850 | 10/1990 | Schloemer | 455/34.1 X |
| 5,111,534 | 5/1992 | Benner | 455/33.2 |
| 5,280,630 | 1/1994 | Wang | 455/62 X |
| 5,293,640 | 3/1994 | Gunmar et al. | 455/62 X |
| 5,448,750 | 9/1995 | Eriksson et al. | 455/34.1 X |

FOREIGN PATENT DOCUMENTS

| | | |
|---|---|---|
| 27 02 023 | 7/1977 | Germany . |
| 40 08 596 | 9/1991 | Germany . |
| 90 10 341 | 9/1990 | WIPO . |

OTHER PUBLICATIONS

Gamst, A., "A Resource Allocation Technique for FDMA Systems", Alta Frequenza, vol. LVII, N. 2, 1988 pp. 89–96.
Hong, D. & Rappaport, S., "Heuristic Channel Assignments for Cellular Land Mobile Radio Systems", IEEE, Global Telecommunications Conf., 1985.

Primary Examiner—Thomas J. Mullen, Jr.
Attorney, Agent, or Firm—Spencer & Frank

[57] ABSTRACT

In a process of allocating frequencies to base stations of a mobile radiotelephone network, which process is based on input information containing at least the number of frequencies required for each base station, the frequencies permissible in the mobile radiotelephone network and information on possible disturbance effects among the base stations in the case of identical and/or adjacent frequencies, the following steps are executed alternatingly: (a) selection of a base station from the number of those base stations to which not all contemplated frequencies have yet been allocated, according to a first base station selection criterion and, if necessary, further base station selection criteria, (b) selection of a frequency according to a first frequency selection criterion and, if necessary, further frequency selection criteria, (c) identification of the frequency from (b) as allocated to the base station from (a).

20 Claims, 2 Drawing Sheets

```
A:  1  2  3̄  4  5̄  6  7  8̄     3/2

B:  1  2̄  3̄  4  5̄  6  7  8     3/2

C:  1  2̄  3̄  4  5̄  6̄  7̄  8̄     2/1

D:  1  2  3̄  4  5̄  6̄  7  8̄     3/2
```

|   | A | B | C | D |
|---|---|---|---|---|
| A | 0 | 12 | 8 | 7 |
| B | 12 | 0 | 2 | 13 |
| C | 8 | 2 | 0 | 12 |
| D | 7 | 13 | 12 | 0 |

```
A:  1   2   3̄   4   5̄   6   7   8̄      3/2

B:  1   2̄   3̄   4   5̄   6   7   8      3/2

C:  1   2̄   3̄   4   5̄   6̄   7̄   8̄      2/1

D:  1   2   3̄   4   5̄   6̄   7   8̄      3/2
```

```
A:  [1]  2̄   3̄   4   5̄   6   7   8̄      2/1

B:  1̄   2̄   3̄   4   5̄   6   7   8      2/2

C:  1   2̄   3̄   4   5̄   6̄   7̄   8̄      2/1

D:  1   2   3̄   4   5̄   6̄   7   8̄      3/2
```

```
A:  [1]  2̄   3̄   4̄   5̄   6   7   8̄      1/1

B:  1̄   2̄   3̄   [4]  5̄   6̄   7   8      1/1

C:  1   2̄   3̄   4   5̄   6̄   7̄   8̄      2/1

D:  1   2   3̄   4̄   5̄   6̄   7   8̄      2/2
```

| | | | | | | | | | |
|---|---|---|---|---|---|---|---|---|---|
| A: | [1] | 2̄ | 3̄ | 4̄ | 5̄ | [6] | 7̄ | 8̄ | 0/0 |
| B: | 1̄ | 2̄ | 3̄ | [4] | 5̄ | 6̄ | 7 | 8 | 1/1 |
| C: | 1 | 2̄ | 3̄ | 4 | 5̄ | 6̄ | 7̄ | 8̄ | 2/1 |
| D: | 1 | 2 | 3̄ | 4̄ | 5̄ | 6̄ | 7 | 8̄ | 2/2 |

FIG 6

| | | | | | | | | | |
|---|---|---|---|---|---|---|---|---|---|
| A: | [1] | 2̄ | 3̄ | 4̄ | 5̄ | [6] | 7̄ | 8̄ | 0/0 |
| B: | 1̄ | 2̄ | 3̄ | [4] | 5̄ | 6̄ | 7 | [8] | 0/0 |
| C: | 1 | 2̄ | 3̄ | 4 | 5̄ | 6̄ | 7̄ | 8̄ | 2/1 |
| D: | 1 | 2 | 3̄ | 4̄ | 5̄ | 6̄ | 7 | 8̄ | 2/2 |

FIG 7

| | | | | | | | | | |
|---|---|---|---|---|---|---|---|---|---|
| A: | [1] | 2̄ | 3̄ | 4̄ | 5̄ | [6] | 7̄ | 8̄ | 0/0 |
| B: | 1̄ | 2̄ | 3̄ | [4] | 5̄ | 6̄ | 7 | [8] | 0/0 |
| C: | 1 | 2̄ | 3̄ | 4 | 5̄ | 6̄ | 7̄ | 8̄ | 2/1 |
| D: | 1̄ | [2] | 3̄ | 4̄ | 5̄ | 6̄ | 7 | 8̄ | 1/1 |

FIG 8

| | | | | | | | | | |
|---|---|---|---|---|---|---|---|---|---|
| A: | [1] | 2̄ | 3̄ | 4̄ | 5̄ | [6] | 7̄ | 8̄ | 0/0 |
| B: | 1̄ | 2̄ | 3̄ | [4] | 5̄ | 6̄ | 7 | [8] | 0/0 |
| C: | 1 | 2̄ | 3̄ | 4 | 5̄ | 6̄ | 7̄ | 8̄ | 2/1 |
| D: | 1̄ | [2] | 3̄ | 4̄ | 5̄ | 6̄ | [7] | 8̄ | 0/0 |

FIG 9

| | | | | | | | | | |
|---|---|---|---|---|---|---|---|---|---|
| A: | [1] | 2̄ | 3̄ | 4̄ | 5̄ | [6] | 7̄ | 8̄ | 0/0 |
| B: | 1̄ | 2̄ | 3̄ | [4] | 5̄ | 6̄ | 7 | [8] | 0/0 |
| C: | 1 | 2̄ | 3̄ | [4] | 5̄ | 6̄ | 7̄ | 8̄ | 1/0 |
| D: | 1̄ | [2] | 3̄ | 4̄ | 5̄ | 6̄ | [7] | 8̄ | 0/0 |

FIG 10

PROCESS OF ALLOCATING FREQUENCIES TO BASE STATIONS OF A MOBILE RADIOTELEPHONE NETWORK

BACKGROUND OF THE INVENTION

The invention relates to a process of allocating frequencies to base stations of a mobile radiotelephone network, which process is based on input information containing at least the number of frequencies required for each base station, the frequencies permissible in the mobile radiotelephone network and information on possible disturbance effects among the base stations in the case of identical and/or adjacent frequencies.

In mobile radiotelephone networks, base stations are distributed over the geographical area which is covered by the mobile radiotelephone network. The base stations comprise transmitting and receiving equipment designed for a communication exchange by way of mobile stations which are located in the service area of the respective base station. Since the number of frequencies that can be used for the mobile radiotelephone network is limited, it cannot be excluded that identical frequencies are assigned to different base stations, which creates interferences if a mobile station receives signals of the same frequency from several base stations. Furthermore, interferences due to closely adjacent frequencies cannot be excluded. Apart from disturbances due to interferences during the reception of the base station signals in the mobile stations (down link), interferences during the reception in the base stations (up link) must also be taken into account.

Therefore, the allocation of frequencies to the individual base stations must be carried out in such a manner that the operation of the mobile radiotelephone network is ensured to have as little interference as possible. For this purpose, different processes have become known in which frequencies are assigned base station by base station, with frequencies being excluded which have already been allocated to another base station, if the interference probability between the base station and the other base station exceeds a predetermined limit value.

In a process disclosed in WO 90/10341, respective maximum groups of base stations are put together successively for the individual frequencies, which base stations had not yet received a frequency and which may all have an identical frequency because of not exceeding minimum requirements. The process is directed at the objective of using as few frequencies as possible.

In a further process (A. Gamst: "A resource allocation technique for FDMA systems" in Alta Frequenza Vol. LVII N. 2), which is used in a computer program that became known under the name of GRAND, respective maximum groups of base station frequency requests that are still pending are formed successively for the individual frequencies. This means that here the case of a base station needing more than one frequency is already considered. If the frequency is fixed, this frequency must be able to simultaneously meet all the frequency requests collected in the group, this means that specific minimum requirements are still complied with. Here, as well, the process is directed at the objective of using as few frequencies as possible. Through an intelligent determination of a minimum number of required frequencies, the process even makes it possible to check if the objective of minimizing the number of frequencies was reached successfully.

In the GLOBECOM 85 report (IEEE Global Telecommunication Conference), a process of allocating channels (frequencies) to cells (base stations) is described. The allocation takes place by selecting a cell (base station) by means of a cell selection criterion. A suitable channel is allocated to the selected cell by means of a channel selection criterion. If a definite selection of suitable cells and/or channels is not successful by way of this selection process, the selection takes place according to a random principle or the allocation is executed by groups, i.e., a channel is assigned to each of the determined cells.

The conventional objective of the known processes, namely minimizing the number of frequencies used, must be questioned. Normally, the operator of a mobile radiotelephone network is allowed to utilize a fixed number of frequencies. The operator will want to use this number so as to ensure that the operation of the mobile radiotelephone network has as little interference as possible.

The known processes suffer from the fact that the first frequencies are used excessively frequently and the last frequencies are used very rarely. Furthermore, based on the limited view with regard to the interference (minimum requirement met or not), frequency schedules are drawn up which needlessly render the operation of the mobile radiotelephone network more difficult due to avoidable interferences.

SUMMARY OF THE INVENTION

It is the object of the present invention to propose a process of allocating frequencies to base stations of a mobile radiotelephone network which results in a more uniform utilization of the available spectrum.

In the preferred embodiment, the process according to the invention is characterized in that the following steps are executed alternatingly:

(a) selection of a base station from the number of those base stations to which not all contemplated frequencies have yet been allocated, according to a first base station selection criterion and, if necessary, further base station selection criteria, (b) selection of a frequency according to a first frequency selection criterion and, if necessary, further frequency selection criteria, (c) identification of the frequency from (b) as allocated to the base station from (a).

An alternative process is that the selection of the frequency under item (b) takes place in that the interference situation of the base stations selected under item (a) is evaluated by means of a so-called interference price function, with the frequencies being selected such that the increase of the interference price function caused by the allocation is minimal.

An advantage of the process according to the invention is that, while taking the possible disturbance effects among the base stations into account, the frequencies are largely distributed uniformly over the mobile radiotelephone network, i.e., over the geographic area. Interference probabilities are preferably suited to describe the disturbance effects. Apart from the interference probabilities, the process according to the invention optimally evaluates further information which is available per se.

The determination of the interference probability is known per se and is described, for example, in the publication WO 90/10341 which has already been mentioned. Accordingly, the interference probability is that portion of the area of the service area for which the useful-to-interference-signal ratio is smaller than a predetermined value. In further processes for determining the interference probability, the area portion may additionally be evaluated by means of the amount of traffic attributable to the portion of the area.

The process according to the invention may be executed in an advantageous manner as a computer program and can process the following input information:

(1) Data regarding the probability of the interference on common channels, first adjacent channels, second adjacent channels, etc. (for up link or down link or a mix of the two).

(2) Indication of the frequencies which are permissible in the network in principle.

(3) The following data for each individual base station:
   (a) number of needed frequencies,
   (b) locally required frequencies,
   (c) locally prohibited frequencies,
   (d) a measure of difficulty,
   (e) traffic load to be carried,
   (f) rate of utilization (traffic load to capacity).

(4) For the common channel case, the case of the first adjacent channel, etc., a respective maximum tolerable interference probability and, below that, a threshold as of which interference probabilities are only considered to be relevant.

(5) A maximum number of frequency allocation passes.

(6) Additional system-specific (e.g. GSM-specific) predetermining elements such as, e.g., interchannel spacings due to transmitting coupler properties.

Under (1) and (4) in this program, at least the data for one of the cases (common channel, first adjacent channel, etc.) are necessary. The following are also necessary: (2), (3)(a) and (5); the following can be omitted: (3)(b)(c) and (6); the following can be set at a default value: (3)(d) to (f).

The process preferably ends if it was possible to meet the frequency demand of each base station in one pass while complying with the ancillary conditions or if the maximum number of frequency allocation passes was executed. In the latter case, the result of the process may possibly only be a partial solution based on which the user can reorient himself with regard to his input data. An allocation pass comprises a plurality of individual allocations in which a frequency is allocated to each base station.

The result of the process ultimately comprises a list in which the frequencies are indicated which are respectively allocated to the base stations. In addition, the list may contain further data such as, e.g., interference probabilities existing after the allocation of the frequencies or free frequencies which may still be allocated if needed.

Although, in principle, a different sequence may also be selected within the framework of the invention, it proved advantageous to respectively first select a base station and then a frequency for the previously selected base station.

An improvement of the process according to the invention is that, furthermore, those individual allocations (frequency to base station) are identified which are no longer permissible based on the selection of the base station and of the frequency in view of the possible disturbance effects, particularly of maximum permissible interference probabilities.

The implementation of the process according to the invention may essentially be broken off at any process stage, whereupon further allocations may be carried out by the respective planner on duty himself. But a modification of the process according to the invention provides that the steps (a) to (c) are repeated until all base stations have been allocated the required number of frequencies or until, in the event of a further demand, no more frequencies are allocatable and that, in the event that no more frequencies are allocatable, the allocation of frequencies is repeated with different input information. Thus, it is ensured that the allocations largely take place in an optimum manner by way of the process according to the invention.

The process according to the invention preferably provides that the first base station selection criterion is the maximum number of frequencies which are still jointly allocatable to this base station in relation to the number of frequencies which are still needed by this base station.

A modification of the process according to the invention is that the pieces of information on possible disturbance effects are interference probabilities and that the sum of the interference probabilities serves as a base station selection criterion, which interference probabilities exist at the base station to be selected because of the use of identical and/or adjacent frequencies in relation to other base stations. Thus, the frequency allocation is further optimized.

As already mentioned above, a measure of the difficulty per base station can be entered as one of the pieces of input information. Frequently, however, the difficulty with which the required frequencies can be allocated to each station only becomes known during the allocation itself—i.e., after one or several allocation passes.

According to another modification it is therefore provided that the input information further contains a measure of difficulty for each base station, which measure is amended subsequent to an allocation that does not meet all the frequency requirements such that the measure of difficulty of those base stations to which the required number of frequencies has not been allocated is increased in a deterministic or non-deterministic manner and that the measure of difficulty is taken into account in the selection of the base station according to step (a).

A further modification includes that, for the selection of the frequency according to step (b), a frequency selection criterion consists in the respective frequency belonging to the highest of the following classes:

of the frequencies permitted at the selected base station, those frequencies are categorized in class 1 whose allocation to the selected base station would generate a value below 1 for the ratio of the maximum number of frequencies which are still jointly allocatable to this base station to the number of frequencies which are still needed by this base station, of the remaining frequencies, those frequencies are categorized in class 2 whose allocation to the selected base station would generate a value below 1 for the ratio of the maximum number of frequencies which are still jointly allocatable to another base station in relation to the number of frequencies which are still needed by this other base station, all other frequencies which have not yet been categorized but are permissible frequencies in the network are categorized in class 3.

Another modification also contributes to an overall favorable interference situation and consists in that an interference situation generated by the allocations that were executed so far is evaluated by means of an interference price function and that the frequency whose allocation results in the smallest increase of the interference price function is selected as a further frequency selection criterion.

This modification remedies a further drawback of the known processes in which, from a matrix of the interference probabilities, a compatibility matrix is derived which comprises the probability values in strict predetermining elements in the sense of "permissible" or "not permissible".

The modification of the invention, however, uses the determined interference probabilities within a predetermined value range. Here, interference probability values that are below the value range can be neglected. Interference probabilities above the value range result in the strict predetermining element "not permissible".

In principle, the allocation is permitted within the value range. But it is taken into account whether the allocation is undesirable on the basis of interferences that are still high. This has the effect that, inter alia, in the frequency allocation, each partial geographic area of the overall area which is to be supplied with frequencies is supplied as well as its interference situation permits.

In this modification, preferably the increase of the interference price function is determined in that the input information further comprises the rate of utilization L and the traffic load V of the individual base stations and in that the increase E of the interference price function is calculated as follows as the sum of evaluations of disturbance effects for relevant interference probabilities $P_{AB}$ and $P_{BA}$ between the previously selected base station A and other base stations B, while taking the number Z of the frequencies required in the respective base station into account:

$$E = \sum_B [(P_{AB} \cdot L_A \cdot L_B \cdot V_A)/Z_A + (P_{BA} \cdot L_B \cdot L_A \cdot V_B)/Z_B]$$

Here, depending on the circumstances in detail, the interference probabilities may also include the probabilities of interferences caused by adjacent channels.

In a calculation of the interference price function, all pairs A and B of base stations are considered for which at least one of the two interference probabilities (in the down link case: disturbance by A in the cell of B, disturbance by B in the cell of A; in the up link case: disturbance at A by mobile station B, disturbance at B by mobile station A) in the common channel case or in an adjacent channel case exceeds a corresponding relevancy limit.

For such a pair A and B, the two directional relationships "A disturbs B" and "B disturbs A" are evaluated separately. These relationships are called relevant disturbance relationships. For "B disturbs A," for example, it is examined for each frequency allocated to base station A whether the same frequency or an adjacent frequency (1., 2., etc.) is used in base station B. For every such case the corresponding interference probabilities are noted. After this processing of all frequencies of base station A, all interference probabilities so noted are added up, are multiplied by the rate of utilization of base station A, the rate of utilization of base station B and the traffic load of base station A and, finally, are divided by the number of frequencies which are to be allocated to base station B.

The result produces the evaluation of the disturbance relationship "B disturbs A." It can be interpreted as the mean probability weighted by the importance of base station A for the overall network with which a user of base station A is disturbed by the operation of base station B during his time of use. The sum of the evaluations of the relevant disturbance relationships is the result of the interference price function.

A further improvement of the process according to the invention is that the frequency of occurrence of the individually allocated frequencies in the mobile radiotelephone network is taken into account as a further frequency selection criterion.

So as to be able to complete a selection in each case, it is provided according to another modification of the invention that a random process is applied during the selection of the base station and/or the selection of the frequency if there are still several base stations and/or frequencies from which a selection can be made after all the previous selection criteria have been applied.

An advantageous embodiment of the process according to the invention is that for the selection of a base station according to step (a), the ratio of the maximum number of frequencies which are still jointly allocatable to this base station to the number of frequencies which are still needed by this base station is used as a first base station selection criterion, that the base station having the smallest ratio is selected, that from several base stations having the smallest ratio a measure of difficulty assigned to the individual base stations is applied as a second selection criterion, with the base station having the largest measure of difficulty being selected, that in the event that the selection with the second base station selection criterion is not definite, as a third base station selection criterion the sum of interference probabilities is applied which exist at the respective base station due to the use of identical frequencies and/or adjacent frequencies in relation to other base stations, with the base station having the largest sum of interference probabilities being selected, and that in the event that the selection following the application of the third selection criterion is not definite, a random selection from among the remaining stations takes place.

Another advantageous embodiment provides that for the selection of the frequency according to step (b), a first frequency selection criterion consists in the respective frequency belonging to the highest of the following classes:

of the frequencies permitted at the selected base station, those frequencies are categorized in class 1 whose allocation to the selected base station would generate a value below 1 at the selected base station for the ratio of the maximum number of frequencies which are still jointly allocatable to this base station to the number of frequencies which are still needed by this base station, of the remaining frequencies, those frequencies are categorized in class 2 whose allocation to the selected base station would generate a value below 1 for the ratio of the maximum number of frequencies which are still jointly allocatable to another base station in relation to the number of frequencies which are still needed by this other base station, all other frequencies which have not yet been categorized but are permissible frequencies in the network are categorized in class 3;

that in the event that the selection according to the first frequency selection criterion is not definite, a possible increase of an interference price function is considered as a second frequency selection criterion, which increase is calculated from those values of the interference probability between the previously selected base station and other base stations which do not exceed the maximum permissible interference probability and are not below an interference probability which is to be considered relevant at all, that the frequency of occurrence of the previously executed allocations of the frequencies serves as a third frequency selection criterion, with the frequency having the lowest frequency of occurrence being selected, and that in the event that the selection according to the application of the third frequency selection criterion is not definite, a random selection from among the remaining frequencies takes place.

A further process of allocating frequencies to base stations of a mobile radiotelephone network according to the invention, which process is based on input information containing at least the number of frequencies required for each base station, the frequencies permissible in the mobile radiotelephone network and the probabilities of the interference (interference probabilities) among the base stations in the case of identical or adjacent frequencies, provides that, step by step, individual base stations and frequencies which are to be allocated are selected and that the interference probabilities are numerically considered in the selection of the frequencies.

The characterizing features of this process contribute considerably to optimizing the mobile radiotelephone network with regard to the interference probabilities and may be used for base stations and frequencies together with other steps and selection criteria.

Preferably, this process only considers the interference probabilities within a value range which is between a minimum value that is considered relevant and a maximum value that is considered to be the maximum permissible value.

BRIEF DESCRIPTION OF THE DRAWINGS

An embodiment of the invention is illustrated in the drawing by way of several figures and is explained in greater detail in the following description. The drawing shows.

DETAILED DESCRIPTION OF THE INVENTION

Figures 1, 2, 3, 4, 5:
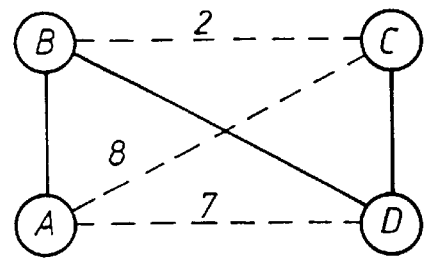
FIG. 1 in the form of a matrix, assumed interference probabilities among four base stations as input quantities, FIG. 2 a graphic representation of the disturbance relationships among the base stations, FIG. 3 to FIG. 10, for each process step, in the form of tables, the correlation between different frequencies, the base stations and the ratio between the residual capacity and the frequencies that are still required.

For the sake of clarity, a very small mobile radiotelephone network having four base stations A, B, C, D is used, which, for example, represents the expansion of an existing network. In practice, however, the process according to the invention executes frequency allocations for mobile radiotelephone networks having hundreds or even thousands of base stations. Furthermore, only eight frequencies are scheduled to be allocated in the embodiment for the sake of clarity.

The embodiment assumes that the interference probabilities illustrated in FIG. 1 have been previously determined. In the so-called down link case, these indicate the probability that a communication between a base station and a mobile station located in its area is disturbed by another base station. According to FIG. 1, for example, there is a 12% probability that base station D will disturb base station C if an identical frequency is used. An interference probability of 10% is considered tolerable at maximum, while interference probabilities of less than 1% are considered to be no longer relevant.

In the extremely simplified embodiment, the interference probabilities relative to already existing base stations of the mobile radiotelephone network are not listed explicitly. It is assumed that they are either not relevant or will result in the prohibition of individual frequencies of the base stations A, B, C or D. The disturbance relationships among the base stations A, B, C, D resulting from the interference probability can also be illustrated in graphic form according to FIG. 2. Here, a solid connecting line signifies a clear prohibition of the use of identical frequencies. A dashed line with a corresponding percentage figure indicates that the use of identical frequencies is permitted but not desired. The undesirability of use increases as the interference probability increases.

For the base stations A to D, the following is assumed to be known:

A requires two frequencies, may not use the frequencies 3, 5 and 8 and has a measure of difficulty of 22.

B requires two frequencies, may not use the frequencies 2, 3 and 5 and has a measure of difficulty of 20.

C requires one frequency, may not use the frequencies 2, 3, 5, 6, 7, 8 and has a measure of difficulty of 30.

D requires two frequencies, may not use the frequencies 3, 5, 6, 8 and has a measure of difficulty of 18.

The frequency utilization options are illustrated in the form of a table in FIG. 3, wherein a bar above a number signifies that the corresponding frequency is prohibited for the respective base station.

For the mobile radiotelephone network to be expanded it is further assumed to be known that in the already existing portion, frequencies are used all the more frequently the higher the number of the frequency. The traffic load and the rate of utilization of the individual base stations are assumed to all be set at the same dummy value 1. At maximum, ten frequency allocation passes are to be executed in the process.

Two frequencies which are shared at a base station must have an interchannel spacing of three because of transmitting coupler properties so that, for example, the use of frequency 4 automatically prohibits use of the frequencies 2, 3, 5 and 6 at the same base station.

Once all input data are known, the process according to the invention starts with a first frequency allocation pass. Here, a first base station must first be selected. For this purpose, the ratios of residual capacity to the number of frequencies that are still required for the base stations A to D are calculated for checking the first-priority base station selection criterion.

This means for base station A:

frequency 1 is usable,
frequency 2 is prohibited because of 1,
frequency 3 is prohibited because of 1 and otherwise,
frequency 4 is usable,
frequency 5 is prohibited because of 4 but also otherwise,
frequency 6 is prohibited because of 4,
frequency 7 is usable,
frequency 8 is prohibited because of 7.

This results in a residual capacity of 3 and a ratio between residual capacity and still required frequencies of 3/2. This ratio as well as the corresponding ratios for the base stations B, C and D are indicated on the right in FIG. 3.

Because of the first-priority base station selection criterion, the frequency allocation must begin with one of the base stations A, B or D. For the selection from among these base stations, a second-priority base station selection criterion, namely the measure of difficulty, is used so that the selection is made in favor of base station A.

For base station A, the frequencies 3, 5 and 8 are prohibited. None of the permitted frequencies (1, 2, 4, 6, 7) would make it impossible, already at this point, to allocate the second required frequency for base station A, this means, class 1 is vacant. Class 2 is also vacant. Since class 3 therefore comprises more than one frequency, sorting from these frequencies continues according to the second-priority criterion for the frequency selection. Since base stations C and D have not yet been allocated any frequencies, the change of the interference price function for each frequency of base station A must be zero. Therefore, a further selection according to the third-priority frequency selection criterion is necessary. According to the remark regarding the utilization frequency in the already existing network, frequency 1 must be selected.

The result of this allocation is that frequencies 2 and 3 may no longer be used in base station A and that frequency 1 may not be used in base station B because of the high interference probability (see FIG. 1). This condition existing after the first individual allocation is illustrated in the table according to FIG. 4. A framed figure signifies that the corresponding frequency has been allocated.

FIG. 4 also illustrates the recalculation of the ratios of residual capacity to the number of still required frequencies which was executed after the first individual allocation. Therefore, base station B is selected for the second individual allocation. For base station B, the frequencies 1, 2, 3 and 5 are prohibited. The selection of frequency 6 would make it impossible, already at this point, to allocate a second frequency to base station B. Therefore, frequency 6 belongs in class 1. Class 2 is vacant, while class 3 comprises the frequencies 4, 7 and 8. Since base station C has not yet been allocated a frequency, the change of the interference price function for the frequency from class 3 respectively must be equal to zero. According to the frequency occurrence criterion mentioned above, frequency 4 must be selected and be allocated to base station B, which is illustrated in FIG. 5. Additionally, FIG. 5 shows the new ratios between residual capacity and still required frequencies. Accordingly, base station A, B and D are possibilities for the third individual allocation according to the first-priority selection criterion. According to the second-priority base station selection criterion, the selection is made in favor of base station A.

Since the frequencies 6 and 7 are both in class 3 and a change in the interference price function cannot take place because of still missing frequencies in base stations C and D, frequency 6 is selected, again according to the frequency occurrence criterion. After this third individual allocation, the intermediate result shown in FIG. 6 is produced.

For the fourth individual allocation, a selection is made in favor of base station B according to the measure of difficulty. The allocation of frequency 7 would mean that base station D could no longer be allocated two frequencies. Frequency 7 therefore belongs into class 2, while frequency 8 belongs into class 3 and is selected. After this fourth individual allocation, the state illustrated in FIG. 7 is produced.

For the fifth individual allocation, a selection is made in favor of base station D. All frequencies that were still left for this base station belong into class 3. The utilization in base station A results in an increase of the interference price function for frequency 1, which is not the case for the frequencies 2 and 7. According to the frequency occurrence criterion, frequency 2 is selected from these frequencies. Subsequently, the state illustrated in FIG. 8 is produced.

For the sixth individual allocation, base station D is again selected. Only frequency 7 is in class 3. It is therefore allocated to base station 7, which is illustrated in FIG. 9.

FIG. 9 also shows that now a frequency only needs to be allocated yet to base station C, for which purpose two frequencies are free, namely the frequencies 1 and 4. The interference price function increases for both frequencies.

This increase is calculated as follows in the event of an allocation of frequency 1: First, an increase of the interference price function is calculated for the relationship "C disturbs A" at an interference probability of 8% (FIG. 1). This disturbance relationship is multiplied by the rate of utilization $L_A$ of base station A, the rate of utilization $L_C$ of base station C and the traffic load $V_A$ of base station A and is divided by the overall number of frequencies required for base station A. Since the rate of utilization L as well as the traffic load V were assumed to be 1, $$(8 \cdot 1 \cdot 1 \cdot 1)/2=4$$

results.

Correspondingly, the increase of the interference price function for the relationship "A disturbs C" is calculated, which results in $$(8 \cdot 1 \cdot 1 \cdot 1)/1=8$$

For all other potential disturbance relationships, the calculations result in 0. The sum of the evaluations (interference price function) has thus increased by 12. In the event that frequency 4 is allocated, a similar calculation leads to an increase of the interference price function by three. From this it follows that, according to the second-priority frequency selection criterion, frequency 4 must be selected. After this seventh individual allocation, the state illustrated in FIG. 10 is produced. This completes the first allocation pass. Since there are no more base stations having an unmet frequency demand, the entire process also ends. The final result illustrated in FIG. 10 meets all ancillary requirements and produces a frequency schedule which ensures a network operation which has as little interference as possible.

What is claimed is:

1. Process of allocating frequencies to base stations of a mobile radiotelephone network, wherein the process is based on information comprising at least the number of frequencies required for each base station, the frequencies permissible in the mobile radiotelephone network and possible disturbance effects among the base stations in the case of at least one of identical frequencies and adjacent frequencies, the process comprising the following steps:

(a) selecting a base station from the base stations to which not all possible frequencies have yet been allocated, according to a first base station selection criterion, and selecting the base station according to further base station selection criteria when the base station is unable to be selected according to the first base station selection criterion, (b) selecting a frequency according to a first frequency selection criterion, and selecting the frequency according to further frequency selection criteria when the frequency is unable to be selected according to the first frequency selection criterion, and (c) allocating the frequency selected in step (b) to the base station selected in step (a).

2. Process according to claim 1, wherein in step (b) the frequency is selected for the base station selected in step (a).

3. Process according to claim 1, further comprising after step (c) identifying base stations and frequencies as no longer permissible based on the base station selected in step (a), the frequency selected in step (b), and the possible disturbance effects.

4. Process according to claim 1, wherein the steps (a) to (c) are repeated until all base stations have been allocated the required number of frequencies or until, in the event of one or more base stations requiring one or more frequencies, no more frequencies are allocatable, and wherein in the event that no more frequencies are allocatable, the steps (b) and (c) are repeated with different information.

5. Process according to claim 1, wherein in step (a) the first base station selection criterion comprises the maximum number of frequencies which are allocatable to a base station in relation to the number of frequencies which are required by the base station.

6. Process according to claim 1, wherein the information on the possible disturbance effects comprises interference probabilities, and wherein in step (a) one of the further base station selection criteria comprises the sum of the interference probabilities for a base station due to the use of at least one of identical frequencies and adjacent frequencies in other base stations.

7. Process according to claim 1, wherein the information further comprises a measure of difficulty for each base station, wherein the measure of difficulty is increased after step (c) for each base station to which the required number of frequencies has not been allocated, and wherein in step (a) one of the further base station selection criteria comprises the measure of difficulty.

8. Process according to claim 1, wherein in step (b), selecting the frequency according to the first frequency selection criterion comprises selecting the frequency belonging to one of the following classes:
   (i) the frequencies permitted at the base station selected in step (a) and whose allocation to the selected base station would generate a value below 1 for the ratio of the maximum number of frequencies which are allocatable to the selected base station to the number of frequencies which are required by the selected base station,
   (ii) the frequencies permitted at the selected base station not in class (i), and whose allocation to the selected base station would generate a value below 1 for the ratio of the maximum number of frequencies which are allocatable to another base station to the number of frequencies which are required by the another base station, and
   (iii) the frequencies permitted at the selected base station, not in class (i), and not in class (ii).

9. Process according to claim 1, further comprising after step (a) evaluating interference due to the selection of the base station in step (a) using an interference evaluation function and wherein in step (b) selecting the frequency according to further frequency selection criteria comprises selecting the frequency resulting in the smallest increase of the interference evaluation function.

10. Process according to claim 9, wherein the information further comprises the rate of utilization L and the traffic load V of a base station and wherein the increase E of the interference evaluation function is calculated by summing weighted interference probabilities $P_{AB}$ and $P_{BA}$ between a previously selected base station A and other base stations B, and considering the number Z of the frequencies required for each base station:

$$E = {}_B\Sigma[(P_{AB} \cdot L_A \cdot L_B \cdot V_A)/Z_A + (P_{BA} \cdot L_B \cdot L_A \cdot V_B)/Z_B].$$

11. Process according to claim 10, wherein the interference probabilities further comprise the probabilities of interferences caused by adjacent frequencies.

12. Process according to claim 1, wherein in step (b) one of the further frequency selection criteria comprises the frequency of occurrence of any allocated frequencies in the mobile radiotelephone network.

13. Process according to claim 1, wherein in step (a) one of the further base station selection criteria comprises a random process.

14. Process according to claim 1, wherein in step (a), the first base station selection criterion comprises the ratio of the maximum number of frequencies which are allocatable to a base station to the number of frequencies which are required by the base station, such that the base station having the smallest ratio is selected, and selecting the base station according to further base station selection criteria comprises:
   selecting the base station according to a second base station criterion when the base station is unable to be selected according to the first base station criterion, the second base station selection criterion comprising a measure of difficulty for each of the base stations selected according to the first base station selection criterion, such that the base station having the largest measure of difficulty is selected,
   selecting the base station according to a third base station criterion when the base station is unable to be selected according to the second base station criterion, the third base station selection criterion comprising the sum of interference probabilities for each of the base stations and due to the use of at least one of identical frequencies and adjacent frequencies in other base stations, such that the base station having the largest sum of interference probabilities is selected, and
   selecting the base station according to a fourth base station criterion when the base station is unable to be selected according to the third base station criterion, the fourth base station selection criterion comprising a random selection from among the base stations selected according to the third base station selection criterion.

15. Process according to claim 1, wherein in step (b), selecting the frequency according to the first frequency selection criterion comprises selecting the frequency belonging to one of the following classes:
   (i) the frequencies permitted at the base station selected in step (a) and whose allocation to the selected base station would generate a value below 1 for the ratio of the maximum number of frequencies which are allocatable to the selected base station to the number of frequencies which are required by the selected base station,
   (ii) the frequencies permitted at the selected base station, not in class (i) and whose allocation to the selected base station would generate a value below 1 for the ratio of the maximum number of frequencies which are allocatable to another base station to the number of frequencies which are required by the another base station, and
   (iii) the frequencies permitted at the selected base station not in class (i), and not in class (ii); and selecting the frequency according to further frequency selection criteria comprises:
   selecting the frequency according to a second frequency selection criterion when the frequency is unable to be selected according to the first frequency selection criterion, the second frequency selection criterion comprising an a possible increase of an interference evaluation function, wherein the increase is calculated from interference probabilities which are between a previously selected base station and other base stations, which do not exceed a maximum interference probability, and which are not below a minimum interference probability,
   selecting the frequency according to a third frequency selection criterion when the frequency is unable to be selected according to the second frequency selection criterion, the third frequency selection criterion comprising the frequency of occurrence of previously allocated frequencies, such that the frequency having the lowest frequency of occurrence is selected, and selecting the frequency according to a fourth frequency selection criterion when the frequency is unable to be selected according to the third frequency selection criterion, the fourth frequency selection criterion comprising a random selection from among the frequencies selected according to the third frequency selection criterion.

16. Process according to claim 1, wherein information on possible disturbance effects comprises interference probabilities, and wherein in step (b) one of the further frequency selection criteria comprises considering interference probabilities between a minimum value and a maximum value.

17. Process according to claim 1, wherein in step (b) one of the further frequency selection criteria comprises a random process.

18. Process according to claim 1, wherein the process is executed as a computer program.

19. Process of allocating frequencies to base stations of a mobile radiotelephone network, wherein the process is based on information comprising at least the number of frequencies required for each base station, the frequencies permissible in the mobile radiotelephone network and possible disturbance effects among the base stations in the case of at least one of identical frequencies and adjacent frequencies, the process comprising the following steps:

(a) selecting a base station from the base stations to which not all possible frequencies have yet been allocated, according to a first base station selection criterion, and selecting the base station according to further base station selection criteria when the base station is unable to be selected according to the first base station selection criterion, (b) evaluating interference due to the selection of the base station in step (a) using an interference evaluation function, (c) selecting a frequency such that the increase of the interference evaluation function is minimal; and (d) allocating the frequency selected in step (c) to the base station selected in step (a).

20. Process of allocating frequencies to base stations of a mobile radiotelephone network, wherein the process is based on information comprising at least the number of frequencies required for each base station, the frequencies permissible in the mobile radiotelephone network and possible disturbance effects among the base stations in the case of at least one of identical frequencies and adjacent frequencies, the process comprising the following steps:

(a) selecting a base station from the base stations to which not all possible frequencies have yet been allocated, according to a first base station selection criterion, and selecting the base station from further base station selection criteria when the base station is unable to be selected according to the first base station selection criterion, (b) selecting a frequency according to a first frequency selection criterion, and selecting the frequency from further frequency selection criteria when the frequency is unable to be selected according to the first frequency selection criterion, and (c) allocating the frequency selected in step (b) to the base station selected in step (a), wherein in step (a) the first base station selection criterion comprises the maximum number of frequencies which are allocatable to a base station in relation to the number of frequencies which are required by the base station.

* * * * *